(12) United States Patent
Yamamoto et al.

(10) Patent No.: US 11,187,130 B2
(45) Date of Patent: Nov. 30, 2021

(54) HONEYCOMB STRUCTURED BODY

(71) Applicants:IBIDEN CO., LTD., Ogaki (JP); TOYOTA JIDOSHA KABUSHIKI KAISHA, Toyota (JP)

(72) Inventors: Hiroya Yamamoto, Ibi-gun (JP); Takeru Yoshida, Toyota (JP); Hiromasa Suzuki, Toyota (JP); Masaru Kakinohana, Toyota (JP); Takumi Tojo, Toyota (JP)

(73) Assignees: IBIDEN CO., LTD., Ogaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 16/745,212

(22) Filed: Jan. 16, 2020

(65) Prior Publication Data

US 2020/0232367 A1 Jul. 23, 2020

(30) Foreign Application Priority Data

Jan. 17, 2019 (JP) .............................. JP2019-006205

(51) Int. Cl.
*F01N 3/28* (2006.01)
(52) U.S. Cl.
CPC ........ *F01N 3/2803* (2013.01); *F01N 2330/02* (2013.01); *F01N 2370/02* (2013.01)
(58) Field of Classification Search
None
See application file for complete search history.

(56) References Cited

U.S. PATENT DOCUMENTS

| 2003/0165638 | A1* | 9/2003 | Louks ................ B01D 39/2068 427/600 |
| 2007/0220871 | A1* | 9/2007 | Zuberi ................... C04B 35/803 60/299 |
| 2009/0291835 | A1 | 11/2009 | Ohno et al. |
| 2019/0143313 | A1 | 5/2019 | Goto et al. |
| 2019/0144342 | A1* | 5/2019 | Goto ...................... B01D 53/94 422/180 |

FOREIGN PATENT DOCUMENTS

| JP | 2005-516877 | 6/2005 |
| JP | 2006-326574 | 12/2006 |
| JP | 2007-229699 | 9/2007 |

(Continued)

*Primary Examiner* — David Sample
*Assistant Examiner* — Elizabeth Collister
(74) *Attorney, Agent, or Firm* — Mori & Ward, LLP

(57) ABSTRACT

A honeycomb structured body includes a honeycomb fired body in which multiple through-holes are arranged longitudinally in parallel with one another with a partition wall therebetween. The honeycomb fired body contains ceriazirconia composite oxide particles and inorganic fibers. 60 to 80% of inorganic fibers observed in a cross-sectional image of the honeycomb structured body cut in a cross-sectional direction perpendicular to a longitudinal direction have a ratio of the length of a long axis to the length of a short axis (long axis/short axis) of 1.00 to 1.30. The length of the long axis is the length of a long axis of a cross section of an inorganic fiber shown in the cross-sectional image. The length of the short axis is the length of a perpendicular bisector of the long axis.

7 Claims, 1 Drawing Sheet

(56) References Cited

FOREIGN PATENT DOCUMENTS

| JP | 2009-006312 | 1/2009 | | |
|----|----|----|----|----|
| JP | 2015-085241 | 5/2015 | | |
| WO | WO 03/004438 | 1/2003 | | |
| WO | WO 2009/141881 | 11/2009 | | |
| WO | WO 2018/012566 | 1/2018 | | |
| WO | WO-2018012565 A1 * | 1/2018 | .............. | B01J 37/08 |

* cited by examiner

HONEYCOMB STRUCTURED BODY

TECHNICAL FIELD

The present invention relates to a honeycomb structured body.

BACKGROUND ART

Exhaust gas discharged from internal combustion engines of automobiles and the like contains harmful gases such as carbon monoxide (CO), nitrogen oxides (NOx), and hydrocarbons (HC). An exhaust gas catalytic converter that decomposes such harmful gases is also referred to as a three-way catalytic converter. A common three-way catalytic converter includes a catalyst layer that is formed by wash-coating the slurry containing precious metal particles having catalytic activity on a honeycomb-shaped monolithic substrate made of cordierite or the like.

Patent Literature 1 discloses an exhaust gas catalytic converter including a monolithic substrate containing ceria-zirconia composite oxide particles and θ-phase alumina particles, wherein noble metal particles are supported on the monolithic substrate.

Patent Literature 2 discloses a honeycomb structured body containing inorganic particles, an inorganic binder, and inorganic fibers, wherein the inorganic fibers have a degree of orientation of 0.5 or less in an a-axis direction parallel to a direction in which cells of the honeycomb structured body extend.

CITATION LIST

Patent Literature

Patent Literature 1: JP 2015-85241 A
Patent Literature 2: WO 2009/141881

SUMMARY OF INVENTION

Technical Problem

In the exhaust gas catalytic converter disclosed in Patent Literature 1, the monolithic substrate contains ceria-zirconia composite oxide particles and θ-phase alumina particles. Patent Literature 1 states that sufficient strength can be imparted to the monolithic substrate by setting the amount of the ceria-zirconia composite oxide particles to 50 wt % or more, for example.

Yet, the exhaust gas catalytic converter containing a ceria-zirconia composite oxide has a high porosity because full sintering is avoided in order to improve conversion performance, and thus failed to achieve a sufficient increase the in strength.

Therefore, studies have been made to increase the strength by adding inorganic fibers to a monolithic substrate.

In the honeycomb structured body containing inorganic fibers disclosed in Patent Literature 2, the compressive strength in a b-axis direction (a direction perpendicular to a longitudinal direction of the honeycomb structured body) is increased by setting the degree of orientation of the inorganic fibers in an a-axis direction (the longitudinal direction of the honeycomb structured body) to 0.5 or less.

The material contemplated in Patent Literature 2 as a material of the honeycomb structured body is zeolite but not a ceria-zirconia composite oxide.

When inorganic fibers whose degree of orientation was adjusted with reference to Patent Literature 2 were added to a honeycomb structured body containing a ceria-zirconia composite oxide, it was found that the honeycomb structured body was easily breakable under tensile stress in the a-axis direction. Thus, it was not possible to obtain a honeycomb structured body containing a ceria-zirconia composite oxide and not easily breakable under tensile stress in the a-axis direction, by simply combining the inorganic fiber addition method and the production method disclosed in Patent Literature 2 to the product disclosed in Patent Literature 1.

The present invention is made to solve the above problem, and aims to provide a honeycomb structured body containing a ceria-zirconia composite oxide and not easily breakable under stress in the a-axis direction.

Solution to Problem

The present invention provides a honeycomb structured body including a honeycomb fired body in which multiple through-holes are arranged longitudinally in parallel with one another with a partition wall therebetween, wherein the honeycomb fired body contains ceria-zirconia composite oxide particles and inorganic fibers, and 60 to 80% of inorganic fibers observed in a cross-sectional image of the honeycomb structured body cut in a cross-sectional direction perpendicular to a longitudinal direction have a ratio of the length of a long axis to the length of a short axis (long axis/short axis) of 1.00 to 1.30, the length of the long axis being the length of a long axis of a cross section of an inorganic fiber shown in the cross-sectional image, the length of the short axis being the length of a perpendicular bisector of the long axis.

The honeycomb structured body contains inorganic fibers, and the orientation of the inorganic fibers is adjusted in a predetermined direction.

With regard to the orientation of the inorganic fibers defined above, when the ratio of long axis/short axis is 1.00, it means that the inorganic fibers each having a true circular cross section are oriented completely parallel to the longitudinal direction (hereinafter also referred to as the "a-axis direction") of the honeycomb structured body. Inorganic fibers each having a ratio of long axis/short axis of 1.00 to 1.30 are considered to be oriented in the a-axis direction although somewhat tilted from the a-axis direction, and that such inorganic fibers are present in a proportion of 60 to 80% means that many inorganic fibers are oriented in the a-axis direction.

When many inorganic fibers are oriented in the a-axis direction as described above, fall out of the inorganic fibers from the partition walls due to the effect of tensile stress in the a-axis direction is prevented, thus resulting in a honeycomb structured body not easily breakable under tensile stress in the a-axis direction.

The upper limit of the proportion of the inorganic fibers oriented in the a-axis direction is set to 80%. This means that not all the inorganic fibers are oriented in the a-axis direction.

Since not all the inorganic fibers are oriented in the a-axis direction, the inorganic fibers can easily tangle with each other, and fall out of the inorganic fibers in the a-axis direction can be further prevented.

In the honeycomb structured body of the present invention, the partition walls preferably have a thickness of less than 0.14 mm.

When the partition walls have a thickness of less than 0.14 mm, an improvement in the structure is required to particularly increase the strength. Therefore, as in the present invention, the proportion of the inorganic fibers oriented in the a-axis direction is adequately defined, so that even a honeycomb structured body including thin partition walls having a thickness less than 0.14 mm can be provided with sufficient strength.

In the honeycomb structured body of the present invention, the inorganic fibers preferably have an average fiber length of 10 to 90 μm.

When the inorganic fibers have an average fiber length of 10 to 90 μm, fall out of the inorganic fibers in the a-axis direction can be prevented. When the inorganic fibers have an average fiber length of less than 10 μm, the inorganic fibers can easily fall out from the partition walls due to the actin of tensile stress in the a-axis direction. When the inorganic fibers have an average fiber length of more than 90 μm, such inorganic fibers easily get stuck in a mold during production of the honeycomb structured body by extrusion.

In the honeycomb structured body of the present invention, the inorganic fibers are preferably present in a proportion of 5 to 20 wt % relative to the weight of the honeycomb fired body.

When the proportion of the inorganic fibers is 5 to 20 wt %, the effect of sufficiently increasing the strength can be achieved while the exhaust gas conversion performance is maintained. When the proportion of the inorganic fibers is less than 5 wt %, the amount of the inorganic fibers may be too small to prevent fall out of the inorganic fibers from the partition walls in the entire honeycomb structured body. When the proportion of the inorganic fibers is more than 20 wt %, the proportion of the ceria-zirconia composite oxide particles is low, which may degrade the conversion performance.

DESCRIPTION OF EMBODIMENTS

[Honeycomb Structured Body]

The honeycomb structured body of the present invention is described.

Figure 1:
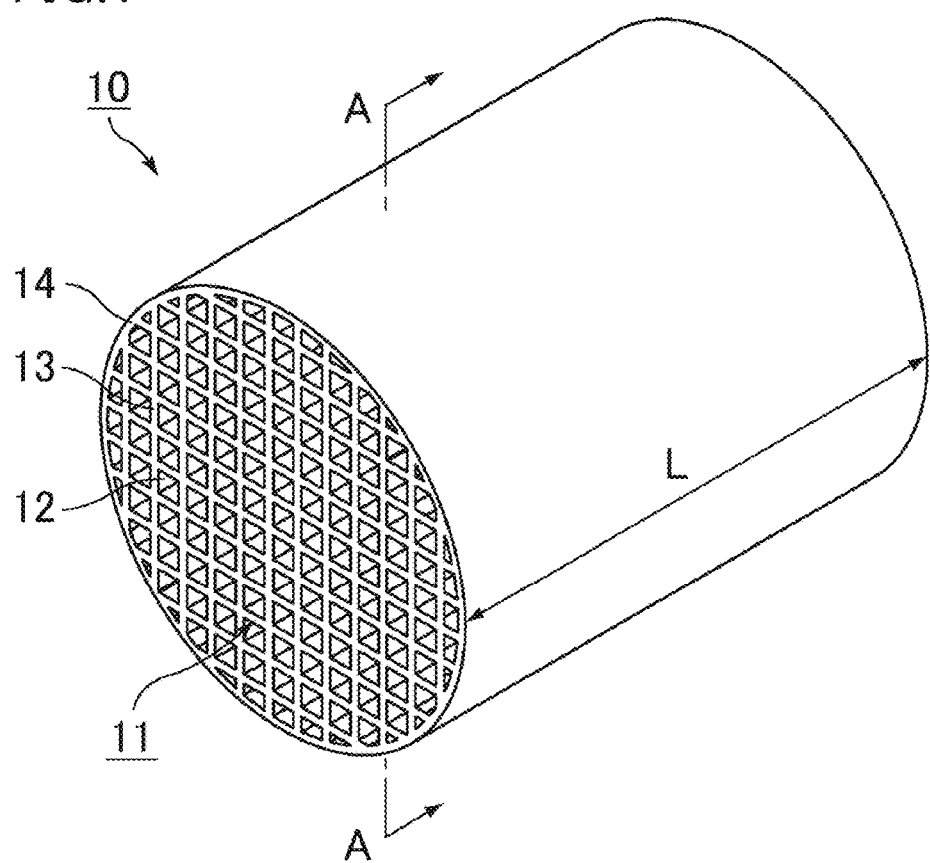
FIG. 1 is a perspective view schematically showing an exemplary honeycomb structured body of the present invention.

FIG. 1 is a perspective view schematically showing an exemplary honeycomb structured body of the present invention.

As shown in FIG. 1, a honeycomb structured body 10 includes a honeycomb fired body 11 in which multiple through-holes 12 are arranged longitudinally (a direction indicated by a double-headed arrow L in FIG. 1) in parallel with one another with a partition wall 13 therebetween, and an outer peripheral wall 14 on the outermost periphery.

The honeycomb fired body 11 contains ceria-zirconia composite oxide particles (hereinafter also referred to as "CZ particles") and inorganic fibers.

When the honeycomb structured body 10 includes only one single honeycomb fired body 11 as shown in FIG. 1, the honeycomb fired body 11 is the honeycomb structured body.

In the honeycomb structured body of the present invention, the honeycomb fired body contains CZ particles and inorganic fibers.

As described later, the honeycomb fired body is produced by extruding a raw material paste containing CZ particles and inorganic fibers, and firing the resulting extrudate.

Whether or not the honeycomb structured body of the present invention contains the CZ particles can be confirmed by X-ray diffraction (XRD).

The honeycomb structured body may further contain alumina particles and an inorganic binder.

In the honeycomb structured body of the present invention, 60 to 80% of inorganic fibers observed in a cross-sectional image of the honeycomb structured body cut in a cross-sectional direction perpendicular to a longitudinal direction have a ratio of the length of a long axis to the length of a short axis (long axis/short axis) of 1.00 to 1.30, the length of the long axis being the length of a long axis of a cross section of an inorganic fiber shown in the cross-sectional image, the length of the short axis being the length of a perpendicular bisector of the long axis.

In the honeycomb structured body of the present invention, the orientation of the inorganic fibers is adjusted in a predetermined direction as described above. The orientation of the inorganic fibers is further described below.

Figure 2:
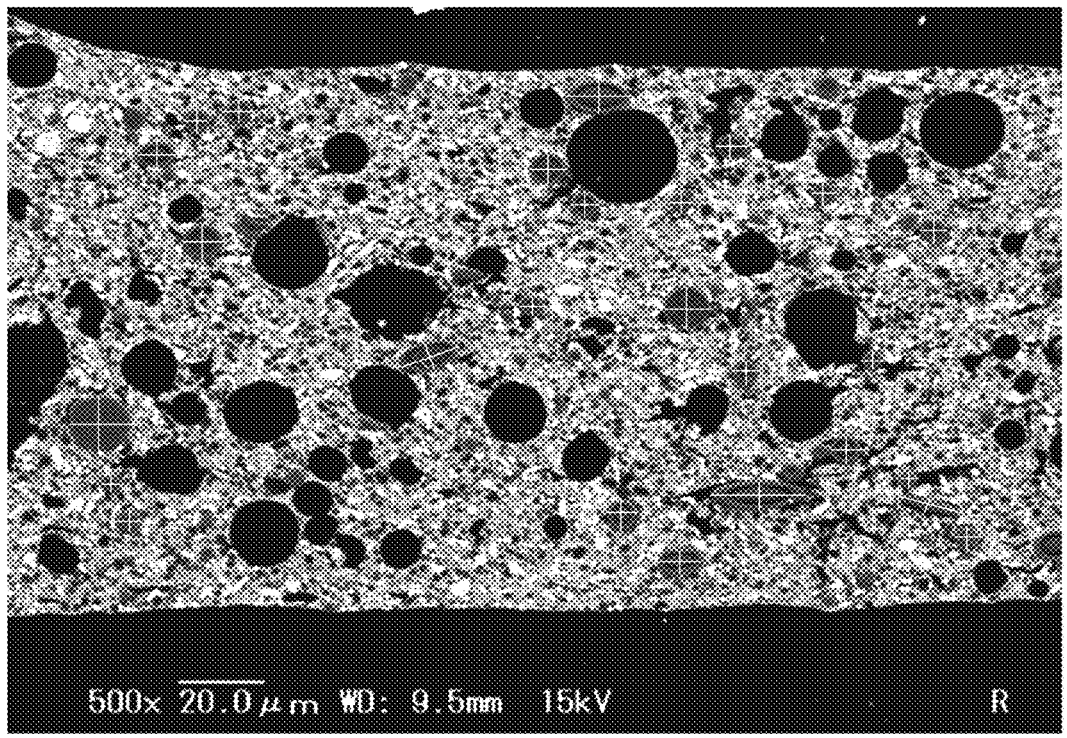
FIG. 2 is an exemplary 500 times magnified cross-sectional image of a honeycomb structured body cut in a cross-sectional direction perpendicular to a longitudinal direction.

FIG. 2 is an exemplary 500 times magnified cross-sectional image of the honeycomb structured body cut in a cross-sectional direction perpendicular to the longitudinal direction.

In FIG. 2, cross sections of inorganic fibers are indicated with crosses. A long axis is drawn in each of circular cross sections and substantially elliptical cross sections of the inorganic fibers, and a perpendicular bisector to the long axis is drawn as a short axis, whereby a cross is drawn.

When the ratio of the long axis to the short axis drawn as described above (long axis/short axis) is 1.00, it means that the inorganic fibers each having a true circular cross section are oriented completely parallel to the longitudinal direction (hereinafter also referred to as the "a-axis direction") of the honeycomb structured body. Inorganic fibers each having a ratio of long axis/short axis of 1.00 to 1.30 are considered to be oriented in the a-axis direction although somewhat tilted from the a-axis direction.

The ratio of long axis/short axis is calculated for each of 100 inorganic fibers shown in the cross-sectional image, and the proportion of inorganic fibers each having a ratio of long axis/short axis of 1.00 to 1.30 is determined. In the honeycomb structured body of the present invention, 60 to 80% of inorganic fibers shown in the cross-sectional image have a long axis/short axis ratio of 1.00 to 1.30. This means that many inorganic fibers are oriented in the a-axis direction in the honeycomb structured body of the present invention. When there are less than 100 inorganic fibers in one cross-sectional image, multiple cross-sectional images are taken randomly until 100 inorganic fibers are captured, and the values are calculated.

When many inorganic fibers are oriented in the a-axis direction as described above, fall out of the inorganic fibers from the partition walls is prevented, thus resulting in a honeycomb structured body not easily breakable under tensile stress in the a-axis direction.

The upper limit of the proportion of the inorganic fibers oriented in the a-axis direction is set to 80%. This means that not all the inorganic fibers are oriented in the a-axis direction.

Since not all the inorganic fibers are oriented in the a-axis direction, the inorganic fibers can easily tangle with each other, and fall out of the inorganic fibers in the a-axis direction can be further prevented.

The average fiber length of the inorganic fibers is not limited, but it is preferably 10 to 90 μm.

The average fiber diameter of the inorganic fibers is not limited, but it is preferably 1 to 5 μm.

The aspect ratio of the inorganic fibers is preferably 5 to 300, more preferably 10 to 200, still more preferably 10 to 100.

The average fiber length of the inorganic fibers can be adjusted by suitably changing crushing conditions of the fibers.

The average fiber diameter of the inorganic fibers can be adjusted by suitably changing the fiber diameter of an inorganic fiber precursor.

The proportion of the inorganic fibers is preferably 5 to 20 wt % relative to the weight of the honeycomb fired body. When the proportion of the inorganic fibers is 5 to 20 wt %, the effect of sufficiently increasing the strength can be achieved while the exhaust gas conversion performance is maintained.

The inorganic fibers may be formed from any material. Examples include alumina, silica, silicon carbide, silica alumina, glass, potassium titanate, and aluminum borate. Two or more of these may be used in combination. Of these, alumina fibers are preferred.

The alumina fibers are inorganic fibers containing 70 wt % or more of alumina, and may also contain other elements such as Si, in addition to Al.

In addition to the alumina fibers, the inorganic fibers may also contain silica fibers, silicon carbide fibers, glass fibers, aluminum titanate fibers, or the like.

The alumina fibers may be either crystalline alumina fibers or amorphous alumina fibers, and may be mixed fibers of crystalline alumina fibers and amorphous alumina fibers.

The alumina fibers are analyzed by powder X-ray diffraction (XRD) to determine those having a diffraction peak in $2\theta$ of 25° to 30° as crystalline alumina fibers and those not having a diffraction peak in this range as amorphous alumina fibers.

The honeycomb structured body of the present invention may include a single honeycomb fired body or multiple honeycomb fired bodies. When the honeycomb structured body includes multiple honeycomb fired bodies, these multiple honeycomb fired bodies are preferably combined together with an adhesive layer.

In the honeycomb structured body of the present invention, the honeycomb fired body preferably contains 25 to 75 wt % of CZ particles.

When the honeycomb fired body contains 25 to 75 wt % of CZ particles, cerium can have higher oxygen storage capacity (OSC).

Examples of the shape of the honeycomb structured body of the present invention include a round pillar shape, a prism, a cylindroid shape, a pillar shape having an end face with a racetrack shape, and a prism with rounded corners (e.g., a triangular pillar shape with rounded corners).

In the honeycomb structured body of the present invention, preferably, the partition walls all have the same thickness. Specifically, the partition walls of the honeycomb fired body preferably have a thickness of less, than 0.14 mm. The thickness is preferably 0.05 mm or more.

In the honeycomb structured body of the present invention, the shape of the through-holes of the honeycomb fired body is not limited to a quadrangular pillar shape. For example, it may be a triangular pillar shape or a hexagonal pillar shape.

The shapes of the through-holes may be different from each other, but preferably, they are the same. In other words, preferably, the through-holes each surrounded by the partition walls in a cross section perpendicular to the longitudinal direction of the honeycomb fired body have the same size.

In the honeycomb structured body of the present invention, the density of the through-holes in a cross section perpendicular to the longitudinal direction of the honeycomb fired body is preferably 31 to 155 pcs/cm$^2$.

In the honeycomb structured body of the present invention, the honeycomb fired body preferably has a porosity of 45 to 70%.

The honeycomb fired body having a porosity of 45 to 70% can achieve a balance between high mechanical strength and exhaust gas conversion performance.

When the honeycomb fired body has a porosity of less than 45%, the percentage of pores that can contribute to internal diffusion of gas is low in the partition walls, which may result in poor exhaust gas conversion performance. When the honeycomb fired body has a porosity of more than 70 vol %, the porosity is so high that the honeycomb structured body has poor mechanical characteristics, and the honeycomb structured body easily cracks, breaks, or the like during use.

The porosity of the honeycomb fired body can be measured by a weighing method described below.

(1) The honeycomb fired body is cut in size of 1.0 cells×10 cells×10 mm to obtain a measurement sample. The measurement sample is ultrasonically washed with deionized water and acetone, and dried in an oven at 100° C. The measurement sample having a size of 10 cells×10 cells×10 mm is a sample that is cut out such that the sample includes 10 through-holes aligned longitudinally×10 through-holes aligned transversely, outermost through-holes, and the partition walls constituting the through-holes, with the longitudinal length being 10 mm.

(2) Using a measuring microscope (Measuring Microscope MM-40 available from Nikon, magnification: 100 times), the cross-sectional dimension of the measurement sample is measured, and the volume is determined from a geometric calculation (when the volume cannot be determined from a geometric calculation, the volume is measured by measuring the water-saturated weight and the weight in water).

(3) The weight of the measurement sample based on assumption that the measurement sample is a completely dense body is calculated from the calculated volume and the true density of the measurement sample measured with a pycnometer. A measurement procedure using a pycnometer is as described in (4) below.

(4) The honeycomb fired body is pulverized to prepare 23.6 cc of powder. The powder is dried at 200° C. for 8 hours. Subsequently, the true density is measured according to JIS R 1620:1995, using Auto Pycnometer 1320 available from Micromeritics. The evacuation time is 40 minutes.

(5) The actual weight of the measurement sample is measured using an electric balance (HR202i available from A & D).

(6) The porosity of the honeycomb fired body is determined by the following formula.

(Porosity of honeycomb fired body)=100−(actual weight of measurement sample/weight of measurement sample based on assumption that the measurement sample is a completely dense body)×100[%]

Even when a noble metal is directly supported on the honeycomb structured body of the present invention, changes in the porosity of honeycomb fired body due to the noble metal are small enough to be ignored.

In the honeycomb structured body of the present invention, the honeycomb fired body may further contain alumina particles and an inorganic binder.

The alumina particles are preferably θ-phase alumina particles.

When the alumina particles are θ-phase alumina particles, owing to their high heat resistance, the honeycomb structured body carrying a noble metal can exhibit high exhaust gas conversion performance even after long-term use.

The inorganic binder is preferably boehmite.

It is because a large part of boehmite is turned into y-alumina after firing.

In the honeycomb structured body of the present invention, a noble metal is preferably supported on the honeycomb fired body.

Examples of the noble metal include platinum group metals such as platinum, palladium, and rhodium.

The amount of the noble metal supported in the entire honeycomb fired body is preferably 0.1 to 15 g/L, more preferably 0.5 to 10 g/L.

The term "amount of the noble metal supported" as used herein refers to the weight of the noble metal per apparent volume of the honeycomb structured body. The apparent volume of the honeycomb structured body includes the volume of the pores. When the honeycomb structured body includes an adhesive layer, the apparent volume includes the volume of the adhesive layer.

In the honeycomb structured body of the present invention, a peripheral coat layer may be formed on the outer periphery of the honeycomb fired body.

The honeycomb structured body of the present invention preferably has an a-axis bending strength of 6.0 MPa or more.

The a-axis bending strength can be determined by measuring the three-point bending strength, assuming the longitudinal direction of the honeycomb structured body as the span distance. In the following formula, σ is the three-point bending strength.

σ(*MPa*)=*M*(bending moment)/*I*(apparent area moment of inertia)×(cross-sectional height of sample)*M*=*w*(load)×1(span distance)/4*I*=*b* (cross-sectional width of sample)×*h*³/12

[Method of Producing Honeycomb Structured Body]

Next, a method of producing the honeycomb structured body of the present invention is described.

The honeycomb structured body of the present invention can be produced by a method including: a molding step of molding a raw material paste containing, for example, CZ particles, alumina particles, inorganic fibers, and an inorganic binder into a honeycomb molded body in which multiple through-holes are arranged longitudinally in parallel with one another with a partition wall therebetween; a drying step of drying the honeycomb molded body obtained in the molding step; and a firing step of firing the honeycomb molded body dried in the drying step to produce a honeycomb fired body.

(Molding Step)

In the molding step, first, CZ particles and inorganic fibers are mixed together to prepare a raw material paste.

The raw material paste may further contain alumina particles, an inorganic binder, an organic binder, a pore-forming agent, a forming auxiliary, a dispersion medium, or the like.

The CZ particles serve as a co-catalyst (an oxygen storage material) of the exhaust gas catalytic converter.

CZ particles are preferably those that form a solid solution of ceria and zirconia.

The CZ particles may further contain a rare earth element in addition to cerium. Example of the rare earth element include scandium (Sc), yttrium (Y), lanthanum (La), praseodymium (Pr), neodymium (Nd), samarium (Sm), gadolinium (Gd), terbium (Tb), dysprosium (Dy), ytterbium (Yb), and ruthenium (Lu).

The amount of ceria in the CZ particles is preferably 20 wt % or more, more preferably 40 wt % or more. At the same time, the amount of ceria is preferably 90 wt % or less, more preferably 80 wt % or less. The amount of zirconia in the CZ particles is preferably 60 wt % or less, more preferably 50 wt % or less. Such CZ particles have a low heat capacity. Thus, the temperature of the honeycomb structured body increases easily, which can provide better warm-up performance.

The average particle size of the CZ particles is preferably 1 to 50 μm. The average particle size of the CZ particles is more preferably 1 to 30 μm. When the CZ particles have an average particle size of 1 to 50 μm, the resulting honeycomb structured body has a larger surface area and thus can have a higher oxygen storage capacity.

The alumina particles may be of any type, but θ-phase alumina particles (hereinafter sometimes referred to as "θ-alumina particles") are preferred.

Use of θ-phase alumina particles as dividers between CZ particles can inhibit sintering of alumina particles to one another by heat during use, allowing for sustained catalytic function. Further, use of θ-phase alumina particles can increase heat resistance.

The alumina particles may have any average particle size. Yet, in order to improve gas conversion performance and warm-up performance, the average particle size is preferably 1 to 10 μm, more preferably 1 to 5 μm.

The average particle sizes of the CZ particles and the alumina particles can be determined using a laser diffraction particle size distribution meter (Mastersizer 2000 available from Malvern Panalytical).

Any material may be used to constitute the inorganic fibers. Examples include alumina, silica, silicon carbide, silica alumina, glass, potassium titanate, and aluminum borate. Two or more of these may be used in combination. Of these, alumina fibers are preferred.

The inorganic binder is preferably boehmite.

Boehmite is alumina monohydrate with a composition of AlOOH, and has good dispersibility in media such as water. Thus, boehmite is preferably used as the alumina binder.

Use of boehmite can decrease the moisture percentage in the raw material paste and improve the formability.

Any organic binder may be used. Examples include methyl cellulose, carboxymethyl cellulose, hydroxyethyl cellulose, polyethylene glycol, phenolic resin, and epoxy resin. Two or more of these may be used in combination.

Any pore-forming agent may be used. Examples include acrylic resins, coke, and starch.

The pore-forming agent is one that is used to introduce pores into a honeycomb fired body when producing a honeycomb fired body.

Any forming auxiliary may be used. Examples include ethylene glycol, dextrins, fatty acids, fatty acid soaps, and polyalcohols. Two or more of these may be used in combination.

Any dispersion medium may be used. Examples include water, organic solvents such as benzene, and alcohols such as methanol. Two or more of these may be used in combination.

When the CZ particles, alumina particles, alumina fibers, and alumina binder are used as the materials of the raw material paste, the percentage of each of these materials relative to the total solids remaining in the raw material paste after the firing step is preferably as follows: CZ particles: 25 to 75 wt %; alumina particles: 15 to 35 wt %; alumina fibers: 5 to 20 wt %, and alumina binder: 5 to 20 wt %.

Preparation of the raw material paste preferably involves mixing/kneading. A device such as a mixer or an attritor may be used for mixing, or a device such as a kneader may be used for kneading.

In the molding step, the raw material paste containing CZ particles and inorganic fibers is extruded into a honeycomb molded body in which multiple through-holes are arranged longitudinally in parallel with one another with a partition wall therebetween.

At this point, with regard to the orientation of the inorganic fibers of the honeycomb structured body, preferably, preparation conditions and molding conditions of the raw material paste are adjusted by one or more of the following methods (these methods may be used in combination) so that the proportion of inorganic fibers each having a ratio of long axis/short axis of 1.00 to 1.30 is 60 to 80%.

(1) The fiber length of the inorganic fibers is adjusted. When the inorganic fibers have a long average fiber length, the inorganic fibers are easily oriented in the a-axis direction.

For example, the inorganic fibers preferably have an average fiber length of 10 to 90 μm.

(2) The flowability of the raw material paste is adjusted (the viscosity is adjusted). When the raw material paste is soft and highly flowable, the inorganic fibers are easily oriented in the a-axis direction.

For example, the raw material paste preferably has a shear stress of 500 Pa·s or less at a shear rate of 500 (1/s).

(3) The molding pressure during extrusion is adjusted. When the molding pressure is high, the inorganic fibers are easily oriented in the a-axis direction.

The molding pressure is preferably 4 to 5 MPa, for example.

(4) A net is placed in an extruder, and the mesh of the net (unit) is adjusted. When the mesh of the net is large, the inorganic fibers are easily oriented in the a-axis direction.

The shape of the honeycomb molded body is not limited, but it is preferably a round pillar shape. The round pillar shape preferably has a diameter of 150 mm or less.

Alternatively, the shape of the honeycomb molded body may be a prism shape. The prism shape is preferably a quadrangular pillar shape.

(Drying Step)

Subsequently, the honeycomb molded body is dried to obtain a honeycomb dried body (drying step).

In the drying step, a dryer such as a microwave dryer, a hot-air dryer, a dielectric dryer, a reduced-pressure dryer, a vacuum dryer, or a freeze-dryer is used to dry the honeycomb molded body to produce a honeycomb dried body.

(Firing Step)

In the firing step, the honeycomb dried body obtained in the drying step is fired into a honeycomb fired body. In this step, the honeycomb dried body is degreased and fired. Thus, the step can also be referred to as a "degreasing/firing step", but is referred to as a "firing step" for the purpose of convenience.

The temperature in the firing step is preferably 800° C. to 1300° C., more preferably 900° C. to 1200° C. The duration of the firing step is preferably 1 to 24 hours, more preferably 3 to 18 hours. The atmosphere of the firing step is not limited, but an atmosphere with an oxygen concentration of 1 to 20% is preferred.

The honeycomb structured body of the present, invention can be produced by the above steps.

(Other Steps)

The method of producing a honeycomb structured body of the present invention may further include a supporting step of allowing a noble metal to be supported on the honeycomb fired body, if necessary.

Examples of the method for allowing a noble metal to be supported on the honeycomb fired body include a method in which the honeycomb fired body or the honeycomb structured body is immersed in a solution containing noble metal particles or a noble metal complex, and the honeycomb fired body or the honeycomb structured body is then pulled up and heated.

When the honeycomb structured body includes a peripheral coat layer, a noble metal may be supported on the honeycomb fired body before the peripheral coat layer is formed, or a noble metal may be supported on the honeycomb fired body or the honeycomb structured body after the peripheral coat layer is formed.

In the method of producing a honeycomb structured body of the present invention, the amount of the noble metal supported in the supporting step is preferably 0.1 to 15 g/L, more preferably 0.5 to 10 g/L.

When the method of producing a honeycomb structured body of the present invention includes forming a peripheral coat layer on the outer periphery of the honeycomb fired body, the peripheral coat layer can be formed by applying a peripheral coat layer paste to the outer periphery of the honeycomb fired body excluding both end faces thereof, and then solidifying the peripheral coat layer paste by drying. A paste having the same composition as the raw material paste can be used as the peripheral coat layer paste.

EXAMPLES

Examples that more specifically disclose the present invention are described below. The present invention is not limited to these examples.

[Production of Honeycomb Structured Body]

Example 1

The following materials were mixed/kneaded into a raw material paste: CZ particles (average particle size: 2 μm) (26.5 wt %); θ-alumina particles (average particle size: 2 μm) (13.2 wt %); alumina fibers (average fiber diameter: 3 μm; average fiber length: 60 μm) (5.3 wt %); boehmite as an alumina binder (11.3 wt %); methylcellulose as an organic binder (7.8 wt %); an acrylic resin as an pore-forming agent (1.9 wt %); graphite also as an pore-forming agent (2.3 wt %); polyoxyethylene oleyl ether (surfactant) as a forming auxiliary (4.3 wt %); and deionized water (27.4 wt %).

[Molding Step]

Using an extruder, the raw material paste was extruded into a round pillar-shaped honeycomb molded body.

A net was placed in the extruder.

The mesh and the molding pressure are as shown in Table 1. The mesh number was 42, and the molding pressure was 4.5 MPa.

[Drying Step]

Using a microwave dryer, the honeycomb molded body was dried with an output of 1.8 A and a microwave irradiation time of 110 seconds.

[Firing Step]

The resulting honeycomb dried body was degreased/fired at 1100° C. for 10 hours, whereby a honeycomb fired body according to Example 1 was produced. The honeycomb fired body had a round pillar shape with a diameter of 117 mm and a length of 80 mm in which the density of the through-holes was 77.5 pcs/cm$^2$ (500 cpsi) and the thickness of the partition wall was 0.127 mm (5 mil).

Examples 2 and 3 and Comparative Examples 1 and 2

Honeycomb structured bodies were produced as in Example 1, except that the net mesh number and the molding pressure were changed for extruding in the molding step.

Table 1 shows the results.

[Measurement of Degree of Orientation]

Cross-sectional images of the honeycomb structured bodies of the examples and the comparative examples were taken. The ratio of long axis/short axis was calculated for each of 100 inorganic fibers shown in each cross-sectional image, and the proportion of inorganic fibers each having a ratio of long axis/short axis of 1.00 to 1.30 was determined. This proportion was regarded as the "degree of orientation". Table 1 shows the results.

[Measurement of Bending Strength]

The a-axis bending strength of each of the honeycomb structured bodies of the examples and the comparative examples was measured.

Each sample for bending strength testing had a cross section width of 5.5 mm, a cross-sectional height of 5.5 mm, and a length (the length of the honeycomb structured body in the longitudinal direction) of 40 mm.

The three-point bending strength was measured with a span distance of 30 mm at a measurement speed of 0.1 mm/min.

Table 1 shows the results.

TABLE 1

| | Molding condition | | Physical properties of honeycomb structured body | |
|---|---|---|---|---|
| | Mesh of net | Molding pressure (MPa) | Degree of orientation (%) | Bending strength (MPa) |
| Example 1 | #42 | 4.5 | 70 | 7.3 |
| Example 2 | #36 | 4.2 | 60 | 6.8 |
| Example 3 | #50 | 4.8 | 80 | 7.5 |
| Comparative Example 1 | #30 | 4.0 | 55 | 5.8 |
| Comparative Example 2 | #60 | 5.0 | 85 | 5.9 |

As shown in Table 1, the honeycomb structured bodies of Examples 1 of 3 each have a degree of orientation of 60-80% and higher bending strength.

This shows that it is possible to produce a honeycomb structured body not easily breakable under tensile stress in the a-axis direction by adjusting the orientation of the inorganic fibers to orient many inorganic fibers in the a-axis direction.

REFERENCE SIGNS LIST

10 honeycomb structured body
11 honeycomb fired body
12 through-hole
13 partition wall
14 outer peripheral wall

The invention claimed is:

1. A honeycomb structured body comprising:
a honeycomb fired body in which multiple through-holes are arranged longitudinally in parallel with one another with a partition wall therebetween,
wherein the honeycomb fired body contains ceria-zirconia composite oxide particles and inorganic fibers, and
60 to 80% of inorganic fibers observed in a cross-sectional image of the honeycomb structured body cut in a cross-sectional direction perpendicular to a longitudinal direction have a ratio of the length of a long axis to the length of a short axis (long axis/short axis) of 1.00 to 1.30, the length of the long axis being the length of a long axis of a cross section of an inorganic fiber shown in the cross-sectional image, the length of the short axis being the length of a perpendicular bisector of the long axis.

2. The honeycomb structured body according to claim 1, wherein the partition walls have a thickness of less than 0.14 mm.

3. The honeycomb structured body according to claim 1, wherein the inorganic fibers have an average fiber length of 10 to 90 μm.

4. The honeycomb structured body according to claim 1, wherein the inorganic fibers are present in a proportion of 5 to 20 wt % relative to the weight of the honeycomb fired body.

5. The honeycomb structured body according to claim 2, wherein the inorganic fibers have an average fiber length of 10 to 90 μm.

6. The honeycomb structured body according to claim 2, wherein the inorganic fibers are present in a proportion of 5 to 20 wt % relative to the weight of the honeycomb fired body.

7. The honeycomb structured body according to claim 3, wherein the inorganic fibers are present in a proportion of 5 to 20 wt % relative to the weight of the honeycomb fired body.

* * * * *